(12) United States Patent
Bharti et al.

(10) Patent No.: US 12,317,103 B2
(45) Date of Patent: May 27, 2025

(54) RELIABILITY-BASED SERVICE CHAIN INSTANCE SELECTION IN A 5G NETWORK

(71) Applicant: INTERNATIONAL BUSINESS MACHINES CORPORATION, Armonk, NY (US)

(72) Inventors: Harish Bharti, Pune (IN); Rajesh Kumar Saxena, Maharashtra (IN); Sandeep Sukhija, Rajasthan (IN); Deepak Bajaj, Leicester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 323 days.

(21) Appl. No.: 17/476,011

(22) Filed: Sep. 15, 2021

(65) Prior Publication Data

US 2023/0081375 A1     Mar. 16, 2023

(51) Int. Cl.
*H04W 24/04*     (2009.01)
*H04W 24/08*     (2009.01)

(52) U.S. Cl.
CPC ........... *H04W 24/04* (2013.01); *H04W 24/08* (2013.01)

(58) Field of Classification Search
CPC ............. H04L 41/0631; H04L 41/0654; H04L 41/0677; H04L 41/0686; H04L 41/124;
(Continued)

(56) References Cited

U.S. PATENT DOCUMENTS

2019/0149397 A1\*   5/2019   Celozzi ............... G06F 9/45558     370/228
2019/0182127 A1\*   6/2019   Pignataro ................ H04L 41/40
(Continued)

FOREIGN PATENT DOCUMENTS

CN    108415775 A     8/2018
CN    111629053 A   \*   5/2020
(Continued)

OTHER PUBLICATIONS

Zhang, D., et al., "Multiple Instances Mapping of Service Function Chain with Parallel Virtual Network Functions", Journal of Algorithms & Computational Technology, vol. 13: pp. 1-10, Sep. 10, 2019.
(Continued)

*Primary Examiner* — Noel R Beharry
*Assistant Examiner* — Angelie T Ngo
(74) *Attorney, Agent, or Firm* — Rakesh Roy, Esq.; Matthew M. Hulihan, Esq.; Heslin Rothenberg Farley & Mesiti P.C.

(57) ABSTRACT

Reliability-based service chain instance selection in a 5G network includes evaluating, for a service chain provided in a 5G network, the service chain comprising a series of network functions with processing hand-offs and take-overs therebetween, reliability of each service chain instance of a plurality of available service chain instances of the service chain, obtaining a service request for processing in the 5G network, the service request to be serviced by the service chain, selecting a service chain instance of the plurality of available service chain instances to process the service request, the selecting being based on the evaluated reliabilities of the plurality of available service chain instances, and invoking processing of the selected service chain instance to process the service request.

17 Claims, 6 Drawing Sheets

(58) Field of Classification Search
CPC . H04L 41/16; H04L 41/5009; H04L 41/5012; H04L 41/5025; H04L 45/22; H04L 43/08; H04L 43/0811; H04L 43/0847; H04L 43/16
See application file for complete search history.

(56) References Cited

U.S. PATENT DOCUMENTS

| | | | |
|---|---|---|---|
| 2020/0084141 A1* | 3/2020 | Bengough | H04L 47/2483 |
| 2020/0336376 A1 | 10/2020 | Mahdi et al. | |
| 2021/0314423 A1* | 10/2021 | Rolando | H04L 45/38 |
| 2023/0062502 A1* | 3/2023 | Nainar | H04L 41/5025 |

FOREIGN PATENT DOCUMENTS

| | | | |
|---|---|---|---|
| CN | 112217874 A | * | 9/2020 |
| CN | 112738820 A | * | 12/2020 |

OTHER PUBLICATIONS

Fountoulakis, E., et al., "An End-to-End Performance Analysis for Service Chaining in a Virtualized Network", IEEE Open Journal of the Communications Society, vol. 1, pp. 148-163, 2020.
Mell, Peter, et al., "The NIST Definition of Cloud Computing", NIST Special Publication 800-145, Sep. 2011, Gaithersburg, MD, 7 pgs.

* cited by examiner

RELIABILITY-BASED SERVICE CHAIN INSTANCE SELECTION IN A 5G NETWORK

BACKGROUND 5G telecommunications technology, also referred to herein as 5G or "5G New Radio", refers to fifth-generation radio access technology overseen by the 3rd Generation Partnership Project (3GPP). Softwarization and virtualization in fifth generation technology standards for 5G broadband cellular networks (referred to as "5G networks") has revolutionized the networking industry. Virtualization of network functions and software-defined networking are key elements for softwarization in 5G networks. Usually one or more network functions are provisioned for delivering end-to-end network services, whereby an ordered list of network functions are instantiated and chained, i.e., as a "service chain", to provide the required or requested end-to-end service. Network function virtualization has made provisioning of services easier by placing dynamically-instantiated virtual network functions (VNFs) into virtual environments provided by servers in data centers.

SUMMARY

Shortcomings of the prior art are overcome and additional advantages are provided through the provision of a computer-implemented method. The method evaluates, for a service chain provided in a 5G network, the service chain including a series of network functions with processing hand-offs and take-overs therebetween, reliability of each service chain instance of available service chain instances of the service chain. The method also obtains a service request for processing in the 5G network. The service request is to be serviced by the service chain. The method selects a service chain instance, of the available service chain instances, to process the service request. The selecting is based on the evaluated reliabilities of the available service chain instances. The method additionally invokes processing of the selected service chain instance to process the service request.

Further, a computer system is provided that includes a memory and a processor in communication with the memory, wherein the computer system is configured to perform a method. The method evaluates, for a service chain provided in a 5G network, the service chain including a series of network functions with processing hand-offs and take-overs therebetween, reliability of each service chain instance of available service chain instances of the service chain. The method also obtains a service request for processing in the 5G network. The service request is to be serviced by the service chain. The method selects a service chain instance, of the available service chain instances, to process the service request. The selecting is based on the evaluated reliabilities of the available service chain instances. The method additionally invokes processing of the selected service chain instance to process the service request.

Yet further, a computer program product including a computer readable storage medium readable by a processing circuit and storing instructions for execution by the processing circuit is provided for performing a method. The method evaluates, for a service chain provided in a 5G network, the service chain including a series of network functions with processing hand-offs and take-overs therebetween, reliability of each service chain instance of available service chain instances of the service chain. The method also obtains a service request for processing in the 5G network. The service request is to be serviced by the service chain. The method selects a service chain instance, of the available service chain instances, to process the service request. The selecting is based on the evaluated reliabilities of the available service chain instances. The method additionally invokes processing of the selected service chain instance to process the service request.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches selecting and invoking service chain instances to use for processing service requests in a 5G network based on reliability metrics of those service chain instances.

As 5G technology aims to provide services for different use cases at different capacities, thousands of virtual network functions (VNFs) are created from sets of servers in chained communication to create service chains (also referred to as service function chains). Service chains can be instantiated into service chain instances. A given service chain implementing a VNF can be instantiated numerous times to provide numerous instances of the service chain. A request for the service provided by the service chain can be routed to and processed by a selected one of those instances.

5G software virtualization characteristics has enabled new features, but issues of availability, reliability, and latency remain. For example, failure of a function or link in a service function chain can bring down the entire service chain and potentially disrupt the overall availability of the service to customers. Efficient operation of a service chain depends on reliability of the chained functions and seamless hand-offs and take-overs between the chained functions and network slices that drive the overall reliability of the service chain.

Aspects described herein provide frameworks determining and using quantities (e.g., metrics) reflective of successful execution within a service chain. Aspects can determine the probabilities of success in utilizing varying available service chain options (instances) before request transmission to a selected service chain instance. This will assist in selecting an optimal service chain instance to utilize to reduce resource waste.

5G technology is expected to open numerous opportunities for on-demand and connected technologies for millions of individual consumer and business environments, workspaces, and devices. Smooth functioning of 5G services depend on seamless hand-off and take-over between 5G network slices. Network slices refers to the virtualized, independent logical networks on the shared 5G physical infrastructure (architecture/equipment). Aspects discussed herein provide quantitative valuations that represent successful execution of a workload (e.g. in the form of processing incoming service requests) through links within a service chain.

For resolving performance of 5G services within a time dimension, which is of significance to the success of 5G Ultra-Reliable Low-Latency Communications (URLLC), aspects described are based on factors termed herein "weak link drop failure", "continued availability", and "chain continuity".

Weak link drop failure (WLDF) refers to the average amount of time a service chain instance remains available to process a service request before the chain's weakest link drops. In the context of 5G wireless communications systems, this metric provides a reliability measure for a service chain instance along a time dimension, e.g. a time-based measure of sustained availability of the service chain instance to process service requests from the time it is instantiated. Service chain instances and the network function instances thereof are brought up and down (infrastructure scaling) to provide flexibility and cost savings. An instance of a service chain/VNF might be brought up when it is needed and then brought down when it is no longer in use. Any "weak link" that drops before the service chain instance completes the workload can be costly. The WLFD provides an average time a workload can be handled within a service chain instance before the chain's weakest link drops. This can be useful in situations requiring instance path selection. For requested processing of a service request (workload), there may be varying service chain instances (paths) available to handle the workload and so a selection is to be made. Ideally, the selected path will have a WLDF greater, perhaps significantly greater, than what is necessary under the required service delivery level, e.g., the time within which the service request processing is to be completed.

Continued Availability (AF) refers to the (relatively) long-term probability that a service chain instance remains available to process a workload (e.g., service request) based on redundancies in network functions of the service chain instance.

Chain Continuity Factor (CCF) refers to the probability that the service chain operating at a current time will continue to operate for a given interval/amount of time ($\Delta t$), and is denoted by $\sigma(t)$.

Described herein are approaches for determining the above factors and optimizing a design to use these in path selection for service request handling. Service operators can present their services, or customers can define service needs, in terms of these factors to enable service providers, designers, and consumers to take them into account when providing and selecting services.

CCF can be determined in terms of weak link drop failure and continuity availability, and applied before transmission of workload (e.g. a service request) down a service chain instance. In examples, a service chain correlates to an available VNF and each available path to use in processing the request is an available instance of that VNF.

The above metrics can be evaluated for each service request to be provided to a service chain for workload processing. In application of the CCF before transmission of the workload, one task can be to derive a framework that links WLDF, AF and CCF in a considered time-dimension to establish the continuity model for a given service chain instance. A service chain can be modeled to have redundancies and the ability to transmit a compute workload (service request) to any of varying available instances. Availability can be defined by there being one or more instances available with long-probability of a desired duration. This provides an indication of success rate to an origin point (e.g. selection component that is to select which service chain instance to use in processing the request) before request transmission, minimizes resource waste in the form of avoiding high risk-of-failure transmission attempts and retransmissions due to unknown network status, and minimizes the resource requirement of a service function chain to achieve higher reliability.

Aspects select links in a service chain and apply a Markov birth-death process to produce a system that demonstrates a homogenous, irreducible Markov process.

The CCF can be modeled such that it can be represented as a special case of WLDF and AF in two parts. The first part is the time-based measure of the sustained reliability of the service chain instance to process service requests from a point when the instance was started. The rated reliability eventually decreases exponentially to a given point that is termed the rate of decomposition. Reliability goes down considerably at the point in time at which a failure link is identified, i.e. the weak link drop failure, but the redundancy aspect—the second part—comes into play, which provides a measure of probability that the service chain instance remains available to process service requests, i.e. long-term viability and continued availability of the redundancy of the service chain instance.

Before a hand-off by a selector (origin) component at a link-point to a service chain instance, the framework identifies a WLDF and AF of each available service chain instance (path), and a CCF for each such path based on the WLDF and AF of that path. The framework links WLDF, AF and CCF in a considered time dimension to establish the continuity model for a given service chain instance. The CF provides the origin an indication about the anticipated success rate of that interaction. A process of the origin can then decide whether or not the probability of success is high enough. Resource waste—transmission attempts due to an unknown network status with high risk-of-failure—can be avoided, as, according to aspects herein, the process can determine to transmit to a given path only if the probability of success in using that path is sufficiently high, for instance above a predefined threshold.

Accordingly, processing can analyze service chain instances and create metrics that evaluate their reliability as a going concern. Handoff points in a service chain instance are termed 'link points' and each link point can be a potential drop point where a service chain instance breaks. Understanding the reliability of the entire service chain instance requires evaluating the reliability of the link points in terms of breakage, checking how strong the redundancy backup is, and the reliability of that redundancy in terms of breakage. Three metrics for this are the CCF, WLDF, and AF, and they are related in that CCF can be represented as a special case of WLDF, denoted as $\omega_f$, and continued availability denoted as a. With this relation being tested and validated, a necessary and sufficient case is created in which slices can work with reliability probability estimates of the slices ahead of the service chain to process the requested workload. The model uses a Markov chain of state increases and state decreases to establish relationships.

Figure 1:
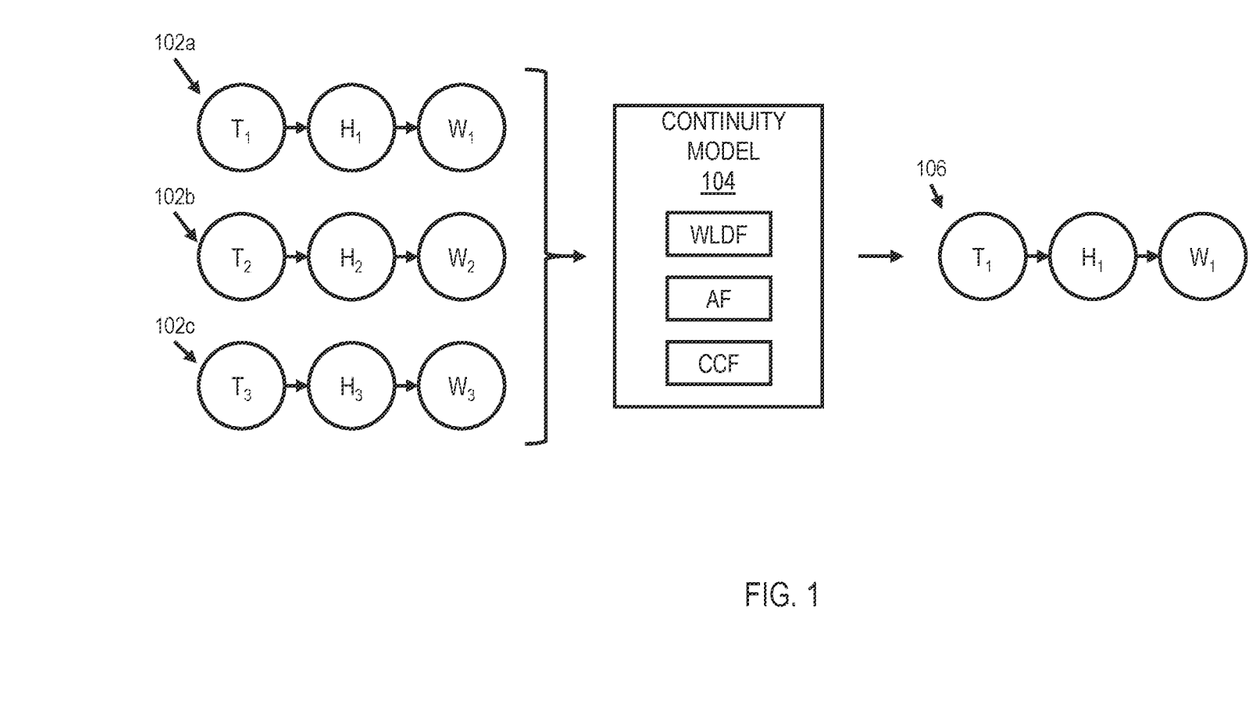
FIG. 1 depicts an example conceptual diagram of using a continuity model for 5G service chain selection, in accordance with aspects described herein.

FIG. 1 depicts an example conceptual diagram of using a continuity model for 5G service chain selection, in accordance with aspects described herein. On the left side of FIG. 1, three service chain instances (available VNF paths) 102a, 102b, 102c are shown. A service chain is a series of resources that hand-off to each other for processing a service request. There are often several available paths/instances of the service chain and a selection is to be made as between them to process a given service request. The service request flows through a service chain instance, which is the sequence of resources (network functions executing on one or more servers), from a start to an end in the sense that the service request is processed by that sequence of entities. In this example, the service chain instances include identical sets of resources T, H, and W; each chain instance 102a, 102b, 102c includes an instance of function T, which hands off to an instance of function H, which hands-off to an instance of function W. The service chain instances each accomplish the same task(s) but use different instances of functions/resources. Thus, a service request can be passed to any of the three (in this example) available service chain instances, each being a different path for service request processing.

In 5G technology, each of the available service chain instances/VNF paths are discrete paths from start to finish and it is not possible for a resource instance in one path to hand-off to a resource instance in another path, for example for instance T1 of path 102a to hand-off to instance H2 of path 102b. Thus, service chain instances can be considered discrete, separable instances with their own set of metrics corresponding thereto.

Aspects of the disclosure, for instance aspects of a continuity model 104, can be invoked when service request processing is to select a service chain instance —102a, 102b, or 102c—to use in processing the service request to perform whatever workload is requested. The available paths are examined through the lens of WLDF, AF, and CCF, and a process identifies/selects which of these paths to process the service request. The selection could be the path indicated as having a highest-success rate, though this need not be the case. The selection could select any path with at least a threshold probability of success in terms of processing the service request. The selected path 106 is selected (path 102a in this example) and the service request is processed by that service chain instance.

VNFs/service chain persist in the general sense, in that the functions will be generally available over a long duration, but network function instances (the instances of T, H, W in this example) can come and go, meaning instances of the network functions and service chain instances themselves might be created and destroyed for scalability. Instances of a chain may be brought up to handle just a single request and then destroyed, though in some examples instances remain alive for a longer duration and may be used in processing two or more requests before being destroyed. This may be dependent on the contract for providing these services.

Service chain instances 102a, 102b, 102c to be evaluated are expected, in general, to have redundancies (like padding) that can result in lower efficacy but if not developed in the design are can predictably lower the success rate expected out of them.

It is also noted that WLDF, AF, and CCF metrics can be calculated at the spawner level rather than the function instance level. The spawner, usually a physical server with spawner processes executing thereon, creates resource instances and is itself virtualized. There may be multiple spawners to spawn respective instances of the same resource (e.g. multiple spawners of instances of T, which create k instances of T, for instance). There may be a respective specific resource spawner for each service request. Thus, if there are two service requests, there may be a respective two T-spawners, with each T-spawner creating three instances of T—T1, T2, and T3—to use for the respective requestor. The spawners are to be maintained and kept per the 5G specification, and hence in this sense service chains remain generally available. Levels of service to deliver to customers will often correlate to the reliability of the spawners used in delivering the requested services, and the reliability of spawners often correlates to the reliability of the hardware executing them; customers may pay more for more reliable hardware. Accordingly, different spawners will spawn various instances of network functions in the service chain instances and so metrics (e.g., CCF, AF, WLDF) for a given service chain instance/path are attributed to the one or more spawners that spawned the network function instances (e.g., T, H, or W in the example above) of that service chain instance.

Each service chain instance has respective associated WLDF, AF, and CCF values, and these values for the service chain instance can change over time due to any of various reasons. CPU load on the underlying hardware, communication problems between hardware (i.e. affecting hand-offs), and spawner software crashes are just a few examples.

A service chain is modeled in a way to have n redundancies and be able to transmit the service request simultaneously to any of k available instances (e.g. instances 102a, 102b, 102c) at any given time. The system is thus deemed to be available if k is available (greater than 0) for a long probability duration, for instance an availability that is adequate to ensure that, without padding of the wait time, the processing time is accommodated to provide average wait time in the queue (while the request waits to be processed). With this in mind, if WLDF is denoted as $\omega_t$ and reliability is represented within the time function as R(t), then $$\omega_t = \int_0^\infty R(t)dt \qquad \text{(Eq. 1)}$$

With continued availability (AF) being denoted as $\alpha_t$, if $P_j(t)$ is the probability of all the 'uptimes' of the system chain, then:

$$\alpha_t = \left[\sum_{j=0}^{n-k} P_j\right]_{P_j = \lim_{t \to \infty} P_j(t)} \qquad \text{(Eq. 2)}$$

where, n is the total number of redundancies, and k is the total number of redundancies over which compute load can be transmitted simultaneously.

Chain continuity factor (CCF) denoted by $\sigma$ characterizes the probability that the system remains operational during an arbitrary time interval t. It serves as a special case of $\omega_t$ and $\alpha_t$ such that:

$$\sigma(t) \supset \{\omega_t = \sigma(t,0); \alpha_t = \sigma(0,t)\} \qquad \text{(Eq. 3)}$$

In Eq. 3 $\sigma(t, 0)$ and $\sigma(0, t)$ refer to is left side and right side probabilities of the distribution function—approaching an event from both sides and finding each side's individual probability to exhaust the probability states of arriving to that bounded time epoch.

Service servers within the 5G core are modeled in a way to provide a load balancing at the point of hand-off. The point at which a link (sub-chain) in an overall service chain hands-off the workload to another link (sub-chain) in the overall service chain is called the link point. It is assumed that there are k redundancies at the link point, as noted above.

Take the following to be true: λ is the arrival rate of the service requests at the link point and μ is the service rate of the service request at the link point. The rates λ and μ are constant and independent, meaning there is an equal probability at all times for a service request to appear (λ) or leave (μ), respectively. The service chain has the capability to sense all n workloads and compute over an arbitrary number of k redundancies simultaneously. A system state j is increased by one whenever a free redundancy is allocated and decreased by one when a blocked redundancy is released. The probability that more than one link is dropped at the same time is taken to be negligible, and transition rates from a failed state is set to '0'.

Figure 2:
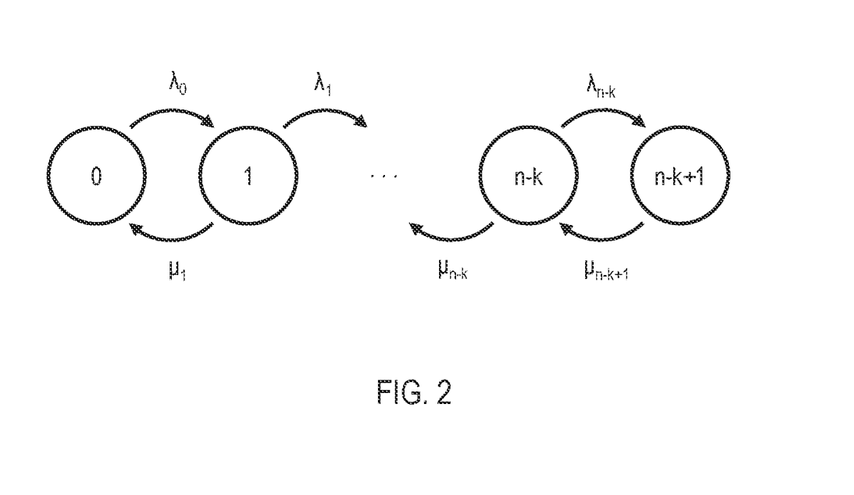
FIG. 2 depicts an example Markov process with states and rates of transition between those states.

The above system model can be applied for links in the service chain as a Markov process shown in FIG. 2. The Markov process includes states 0, 1, . . . , n−k, n−k+1 and rates of transition between those states. $\lambda_s$ is the rate at which the process transitions from state s to state s+1 (a state increase), while $\mu_s$ is the rate at which the process transitions from state s to state s−1 (a state decrease).

Here the system is a homogenous irreducible Markov process. From FIG. 1 and Eq. 1 above, we get:

$$\omega^*_k = \mathcal{L}(\omega_k(t)) = \int_0^\infty R_k(t)e^{-st}dt \quad \text{(Eq. 4)}$$

Figure 3:
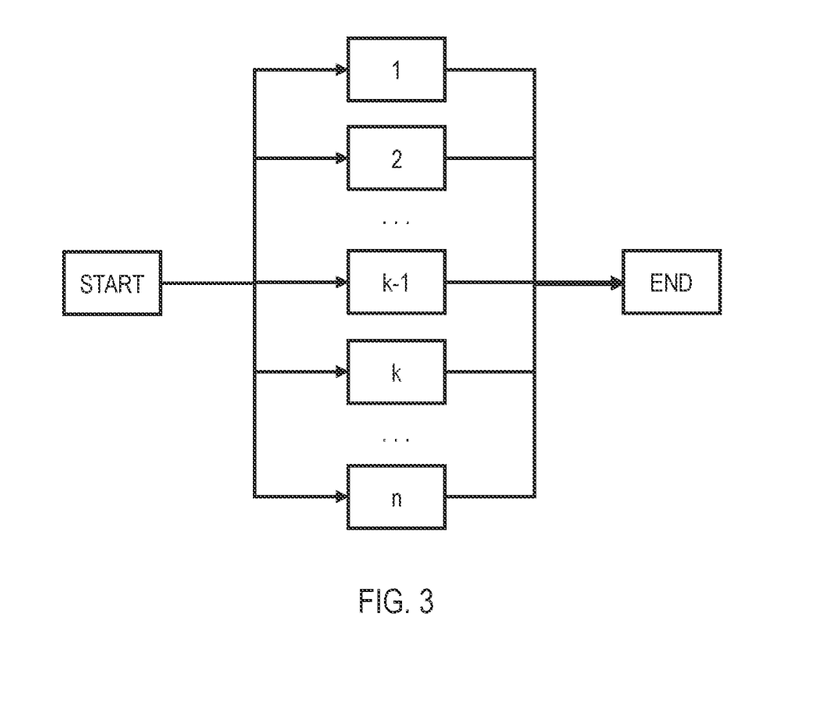
FIG. 3 depicts an example redundancy structure within a service chain.

The redundancy can be structured as a k-o-o-n (k instances that should remain available out of n instances to provide the reliability) as shown in FIG. 3.

With a Laplace parameter set to 0, the Markov process in the state equation (Eq. 4) becomes:

$$\omega *_k = \frac{1}{\lambda}\sum_{j=0}^{n-k} \rho^{j-n} \sum_{l=k}^{n-j} \rho^l \Pi_{i=l}^{n-j-1}(n-j) \quad \text{(Eq. 5)}$$

Where l is the link point at which the service request is to be transmitted, j is the number of states available, k is the number of instances parallelly available to transmit the load (for the system to be defined as available), and n is the total number of the instances available at service servers.

With all the instances available at t=0, Eq. 5 can be reduced to:

$$\omega *_k = \frac{1}{\lambda \rho^{n-j}}\sum_{l=k}^{n-j} \rho^l \Pi_{i=l}^{n-j-1}(n-j) \quad \text{(Eq. 6)}$$

To satisfy Eq. 3 above, we can examine the state decrease process of FIG. 1 such that the state probabilities are as follows:

$$\sigma(t) :: \begin{cases} \lambda_i = 0 \\ \mu_i = i\mu \end{cases} i = 0,1,2 \quad \text{(Eq. 7)}$$

$$\sigma(t) \equiv \begin{cases} \frac{d}{dt}R_k(t) = -n\mu R_k(t) \\ \frac{d}{dt}R_i(t) = (i+1)\mu R_{i+1}(t) - n\mu R_i(t) \end{cases} i = 0,1,2 \quad \text{(Eq. 8)}$$

With $R_n(t) = e^{-n\mu t}$, we obtain the following recursive function solution:

$$R_i(t) = \binom{n}{i}(e^{-\mu t})^i(1 - e^{-\mu t})^{n-i} \quad \text{(Eq. 9)}$$

From Eq. 9, Eq. 2, Eq. 6, and Eq. 3, we get:

$$\sigma(t, \Delta t) = R_i(0)e^{-\mu t}\omega *_t + \binom{1_+}{0_-}e^{-\mu \Delta t}\alpha_t \quad \text{(Eq. 10)}$$

Thus, we see that CCF can be represented as a special case of WLDF $\omega_t$ and continued availability $\alpha_t$.

Eq. 10 for CCF σ(t,Δt) includes two parts. The first part $R_i(0)e^{-\mu t}\omega^*t$ is the known reliability of the point when the process is started at t=0. The rated reliability will eventually go down exponentially to a given point which is termed the rate of decomposition, i.e., the rate of state decrease. Reliability goes down considerably at the point in time a failure link is identified, i.e. weak link drop failure, but at this stage the redundancy aspects of the second part $$\binom{1_+}{0_-}e^{-\mu \Delta t}\alpha_t$$

comes into play. The second part of equation gives the redundancy long-term viability including continued availability of the redundancy of the service chain instance.

Figure 4:
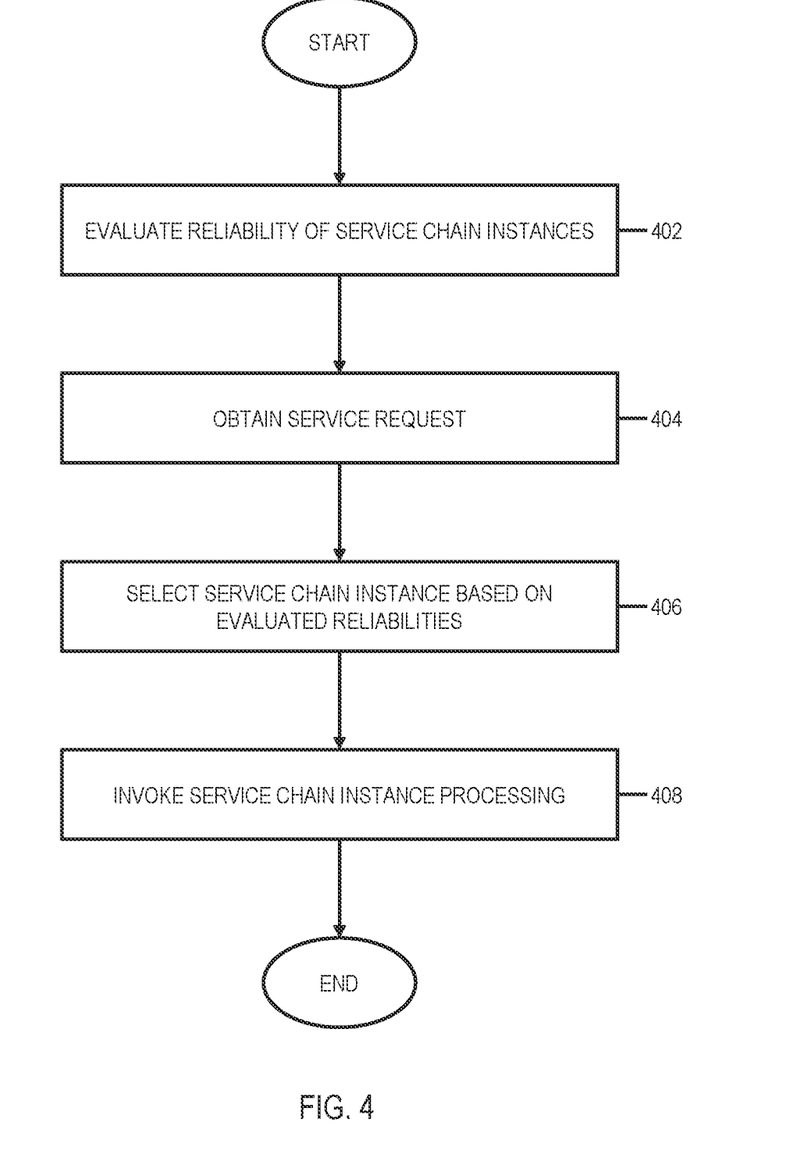
FIG. 4 depicts an example process for redundancy-based service chain instance selection in a 5G network, in accordance with aspects described herein.

FIG. 4 depicts an example process for reliability-based service chain instance selection in a 5G network for processing a service request, in accordance with aspects described herein. In some examples, the process is performed by one or more computer systems, such as those described herein, which may include one or more computer systems of hardware infrastructure of a 5G network, such as one or more cloud servers and/or other hardware for processing service requests.

The process begins by, for a service chain provided in a 5G network, the service chain comprising a series of network functions with processing hand-offs and take-overs therebetween, evaluating reliability (402) of each service chain instance of a plurality of available service chain instances of the service chain. The process obtains (404) a service request for processing in the 5G network, the service request to be serviced by the service chain, and selects (406) a service chain instance of the plurality of available service chain instances to process the service request. The selecting is based on the evaluated reliabilities of the plurality of available service chain instances. The process then invokes (408) processing of the selected service chain instance to process the service request.

The evaluating (402) reliability of a service chain instance, of the plurality of available service chain instances, can include determining a chain continuity factor of the service chain instance, where the chain continuity factor indicate a probability that the service chain instance operational at a current time will remain operational from the current given time for a given duration of time. The chain continuity factor can be determined as a function based on (i) a time-based measure of sustained availability of the service chain instance to process service requests from instantiation of the service chain instance, and (ii) a measure of probability that the service chain instance remains available to process service requests. The time-based measure of sustained availability includes, for instance, a weak link drop failure metric indicating an average amount of time that the service chain instance remains available to process a service request before a link within the service chain instance drops. The measure of probability that the service chain instance remains available includes, for instance, a continued availability factor indicating probability that a service chain instance remains available to process a workload based on redundancies in network functions of the service chain instance.

In embodiments, different spawner components spawn different network functions of the plurality of service chain instances, and the determined chain continuity factor of a service chain instance is associated with the one or more spawner components, of the different spawner components, that spawned the network functions of the service chain instance.

Although various examples are provided, variations are possible without departing from a spirit of the claimed aspects.

Figure 5:
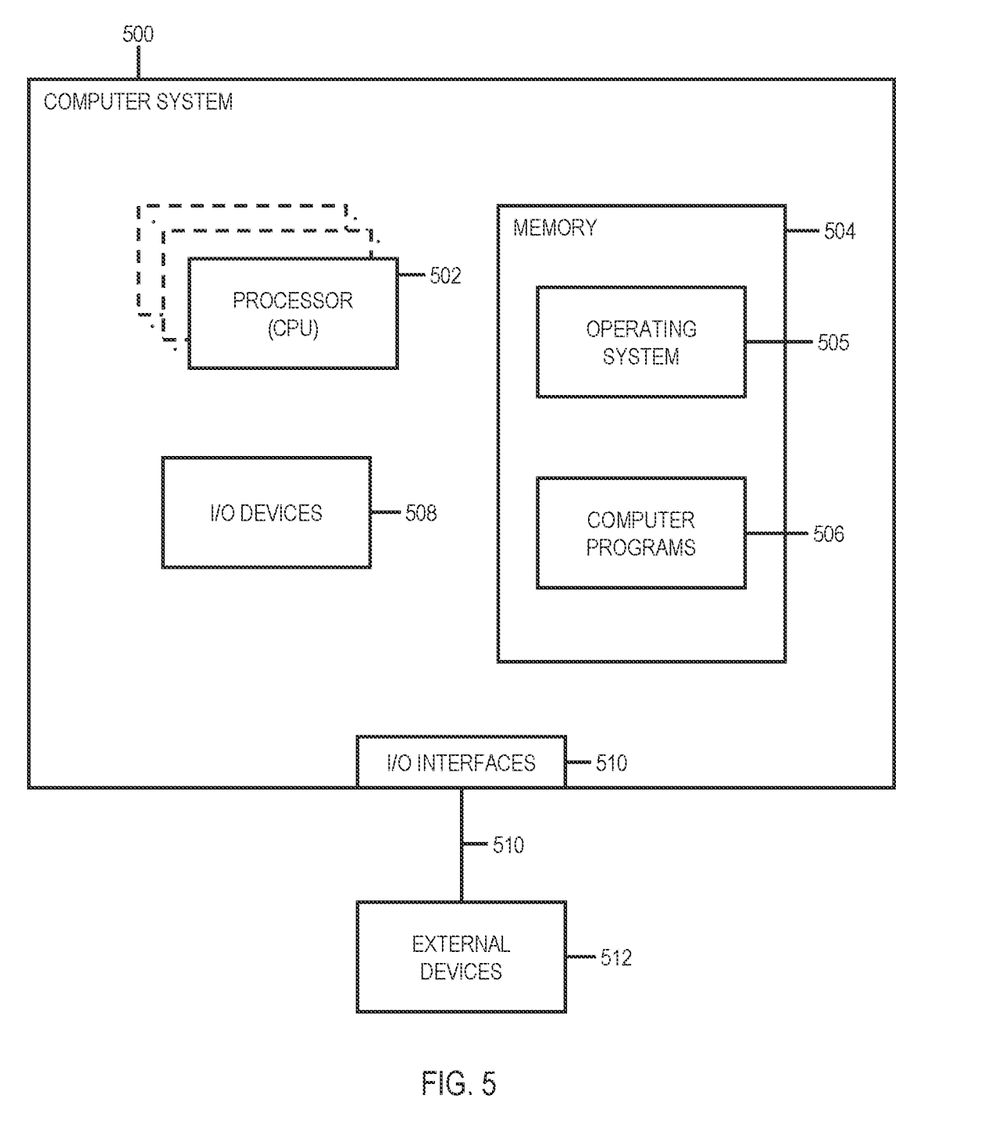
FIG. 5 depicts one example of a computer system and associated devices to incorporate and/or use aspects described herein.

Processes described herein may be performed singly or collectively by one or more computer systems, such as one or more 5G infrastructure hardware, as examples. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
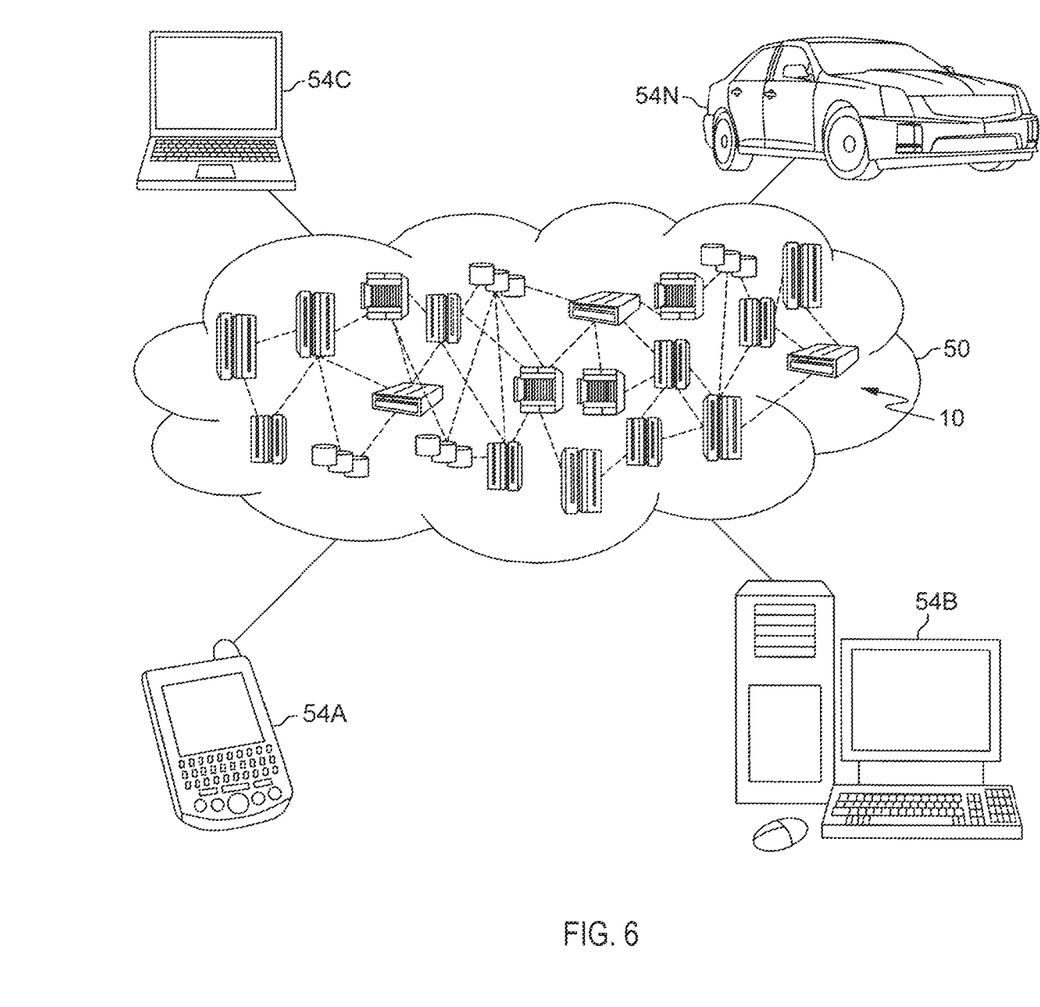
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
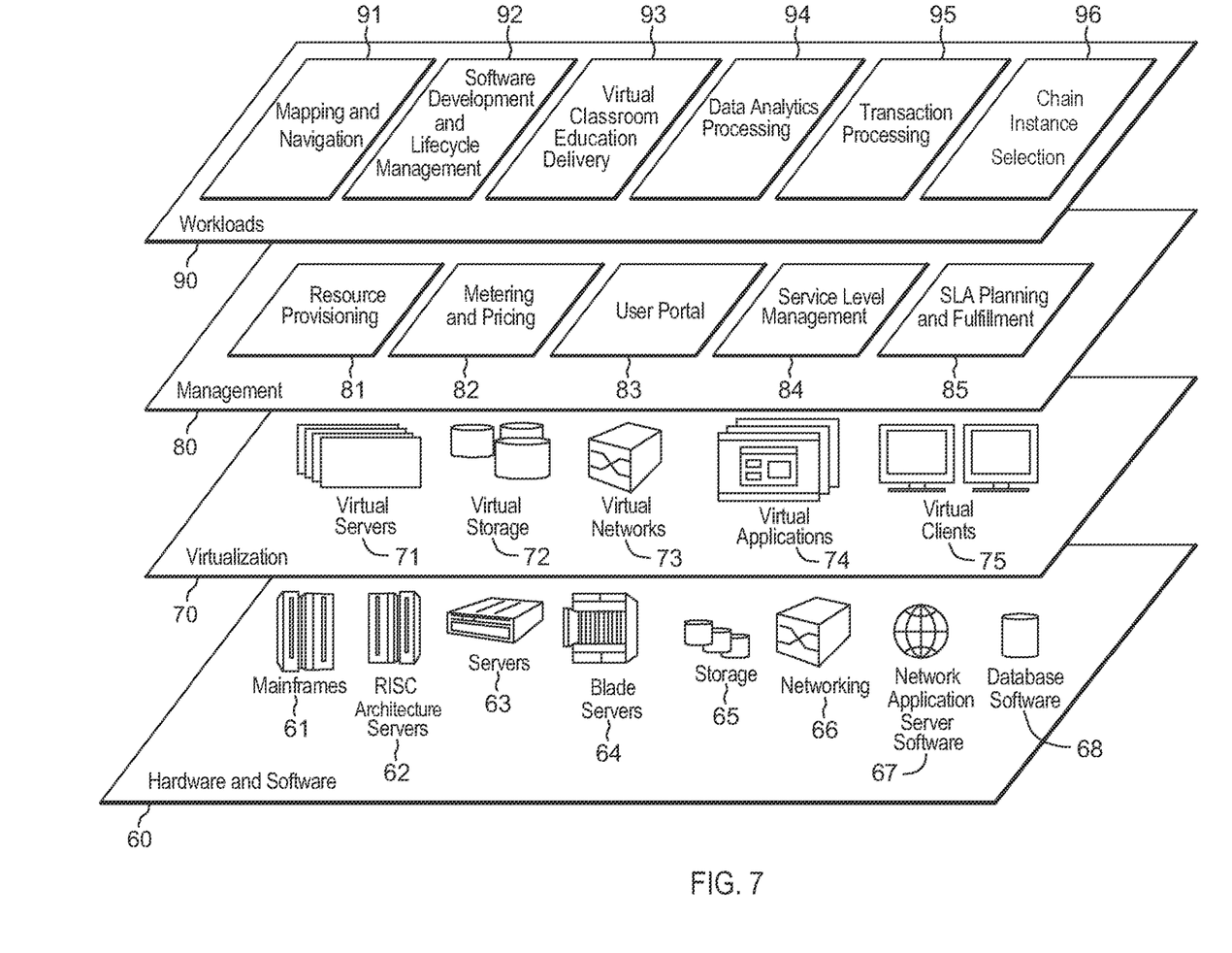
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service chain instance selection 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    for a service chain provided in a 5G network, the service chain comprising a series of network functions with processing hand-offs and take-overs therebetween, evaluating reliability of each service chain instance, of a plurality of available service chain instances of the service chain, in accomplishing a same set of one or more tasks for processing service requests, each service chain instance of the plurality of service chain instances comprising a respective instance of each network function of the network functions of the service chain and being an alternative to the other service chain instances, of the plurality of service chain instances, for processing the service requests, wherein the evaluating the reliability of a service chain instance, of the plurality of available service chain instances, comprises determining a chain continuity factor of the service chain instance, the chain continuity factor indicating a probability value that the service chain instance operational at a current time will remain operational from the current time for a given duration of time;
    obtaining a service request for processing in the 5G network, the service request to be serviced by the service chain;
    selecting a service chain instance of the plurality of available service chain instances to process the service request, the selecting being based on the evaluated reliabilities of the plurality of available service chain instances; and
    invoking processing of the selected service chain instance to process the service request.

2. The method of claim 1, wherein the chain continuity factor is determined as a function based on a time-based measure of sustained availability of the service chain instance to process service requests from instantiation of the service chain instance.

3. The method of claim 2, wherein the time-based measure of sustained availability comprises a weak link drop failure metric indicating an average amount of time that the service chain instance remains available to process a service request before a link within the service chain instance drops.

4. The method of claim 2, wherein the chain continuity factor is determined as a function further based on a measure of probability that the service chain instance remains available to process service requests.

5. The method of claim 4, wherein the measure of probability that the service chain instance remains available comprises a continued availability factor indicating probability that a service chain instance remains available to process a workload based on redundancies in network functions of the service chain instance.

6. The method of claim 2, wherein different spawner components spawn different network functions of the plurality of service chain instances, and wherein the determined chain continuity factor of a service chain instance is associated with the one or more spawner components, of the different spawner components, that spawned the network functions of the service chain instance.

7. A computer system comprising:
a memory; and
a processor in communication with the memory, wherein the computer system is configured to perform a method comprising:
for a service chain provided in a 5G network, the service chain comprising a series of network functions with processing hand-offs and take-overs therebetween, evaluating reliability of each service chain instance, of a plurality of available service chain instances of the service chain, in accomplishing a same set of one or more tasks for processing service requests, each service chain instance of the plurality of service chain instances comprising a respective instance of each network function of the network functions of the service chain and being an alternative to the other service chain instances, of the plurality of service chain instances, for processing the service requests, wherein the evaluating the reliability of a service chain instance, of the plurality of available service chain instances, comprises determining a chain continuity factor of the service chain instance, the chain continuity factor indicating a probability value that the service chain instance operational at a current time will remain operational from the current time for a given duration of time;
obtaining a service request for processing in the 5G network, the service request to be serviced by the service chain;
selecting a service chain instance of the plurality of available service chain instances to process the service request, the selecting being based on the evaluated reliabilities of the plurality of available service chain instances; and
invoking processing of the selected service chain instance to process the service request.

8. The computer system of claim 7, wherein the chain continuity factor is determined as a function based on a time-based measure of sustained availability of the service chain instance to process service requests from instantiation of the service chain instance.

9. The computer system of claim 8, wherein the time-based measure of sustained availability comprises a weak link drop failure metric indicating an average amount of time that the service chain instance remains available to process a service request before a link within the service chain instance drops.

10. The computer system of claim 8, wherein the chain continuity factor is determined as a function further based on a measure of probability that the service chain instance remains available to process service requests.

11. The computer system of claim 10, wherein the measure of probability that the service chain instance remains available comprises a continued availability factor indicating probability that a service chain instance remains available to process a workload based on redundancies in network functions of the service chain instance.

12. The computer system of claim 8, wherein different spawner components spawn different network functions of the plurality of service chain instances, and wherein the determined chain continuity factor of a service chain instance is associated with the one or more spawner components, of the different spawner components, that spawned the network functions of the service chain instance.

13. A computer program product comprising:
a computer readable storage medium readable by a processing circuit and storing instructions for execution by the processing circuit for performing a method comprising:
for a service chain provided in a 5G network, the service chain comprising a series of network functions with processing hand-offs and take-overs therebetween, evaluating reliability of each service chain instance, of a plurality of available service chain instances of the service chain, in accomplishing a same set of one or more tasks for processing service requests, each service chain instance of the plurality of service chain instances comprising a respective instance of each network function of the network functions of the service chain and being an alternative to the other service chain instances, of the plurality of service chain instances, for processing service requests, wherein the evaluating the reliability of a service chain instance, of the plurality of available service chain instances, comprises determining a chain continuity factor of the service chain instance, the chain continuity factor indicating a probability value that the service chain instance operational at a current time will remain operational from the current time for a given duration of time;
obtaining a service request for processing in the 5G network, the service request to be serviced by the service chain;
selecting a service chain instance of the plurality of available service chain instances to process the service request, the selecting being based on the evaluated reliabilities of the plurality of available service chain instances; and
invoking processing of the selected service chain instance to process the service request.

14. The computer program product of claim 13, wherein the chain continuity factor is determined as a function based on (i) a time-based measure of sustained availability of the service chain instance to process service requests from instantiation of the service chain instance, and (ii) a measure of probability that the service chain instance remains available to process service requests.

15. The computer program product of claim 14, wherein the time-based measure of sustained availability comprises a weak link drop failure metric indicating an average amount of time that the service chain instance remains available to process a service request before a link within the service chain instance drops.

16. The computer program product of claim 14, wherein the measure of probability that the service chain instance remains available comprises a continued availability factor indicating probability that a service chain instance remains available to process a workload based on redundancies in network functions of the service chain instance.

17. The computer program product of claim 14, wherein different spawner components spawn different network functions of the plurality of service chain instances, and wherein the determined chain continuity factor of a service chain instance is associated with the one or more spawner components, of the different spawner components, that spawned the network functions of the service chain instance.

* * * * *